United States Patent [19]

Cusati

[11] Patent Number: 4,856,927
[45] Date of Patent: Aug. 15, 1989

[54] MIDPOINT CONNECTION FOR INTERMEDIATE SHAFT SUBASSEMBLY

[75] Inventor: Ward R. Cusati, Farmington, Conn.

[73] Assignee: The Torrington Company, Torrington, Conn.

[21] Appl. No.: 202,366

[22] Filed: Jun. 6, 1988

[51] Int. Cl.$^4$ .............................................. F16B 7/10
[52] U.S. Cl. ..................................... 403/104; 403/379; 403/4; 74/493
[58] Field of Search ................... 403/4, 378, 379, 108, 403/109, 104; 74/493

[56] References Cited

U.S. PATENT DOCUMENTS

| 3,741,032 | 6/1973 | Baker | 74/492 |
| 3,990,323 | 11/1976 | Kamikawa | 403/4 X |
| 4,504,164 | 3/1985 | Bien | 403/379 X |
| 4,587,864 | 5/1986 | Kassai | 403/109 X |

FOREIGN PATENT DOCUMENTS 1079160 8/1967 United Kingdom ................... 74/493

Primary Examiner—Andrew V. Kundrat
Attorney, Agent, or Firm—Wayne O. Traynham

[57] ABSTRACT

An intermediate shaft subassembly comprises two members—an inner intermediate shaft member and an outer intermediate tube member. The subassembly connects the upper section of the intermediate shaft to the lower section of the intermediate shaft. The two members of the subassembly make a sliding fit, with the shaft member telescoping inside the tube member, and they are connected by a midpoint connection near their junction where they overlap. The midpoint connection comprises a bolt which is positioned through aligned holes through the tube member and an elongated slot through the shaft member. The elongated slot allows the shaft and tube members to be positioned in variable relative positions before the bolt is tightened to lock the two members together. When the bolt is tightened, the tube member is deformed around the shaft member to form a tight connection with minimal rotational lash.

2 Claims, 1 Drawing Sheet

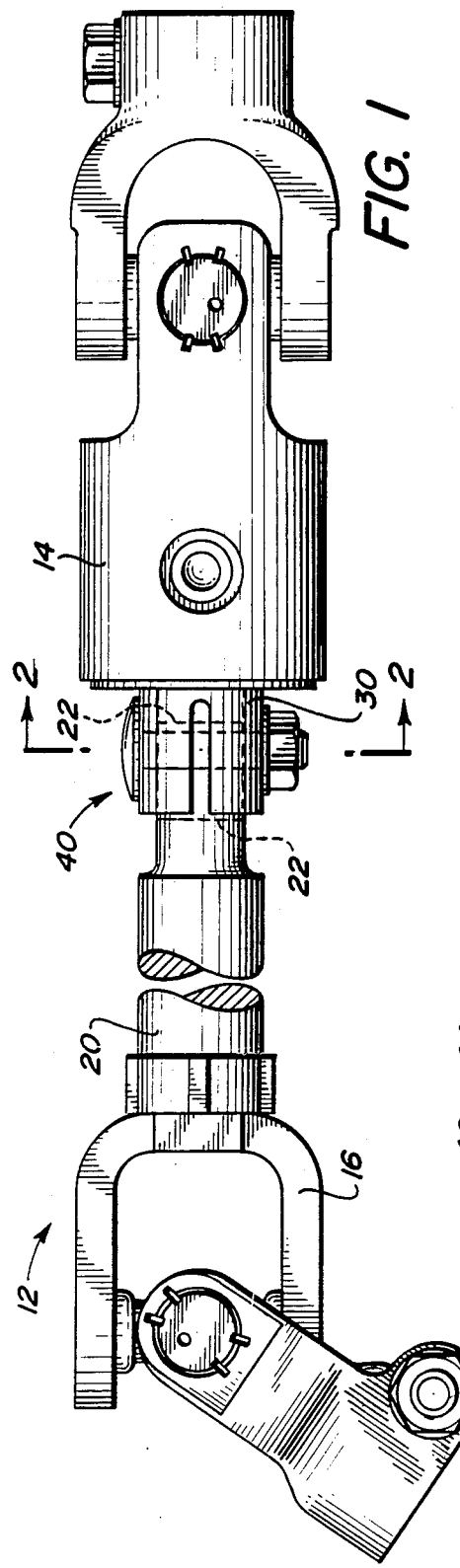
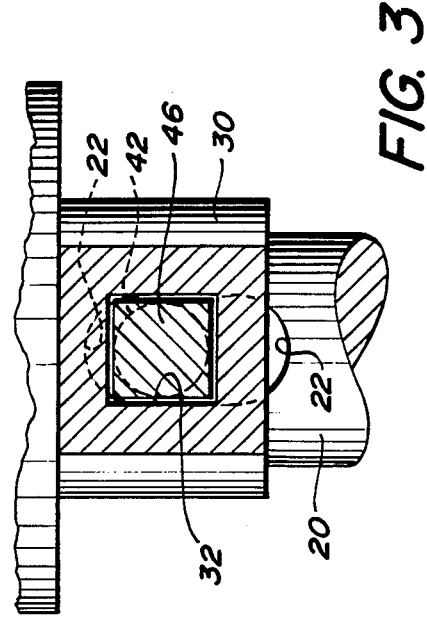
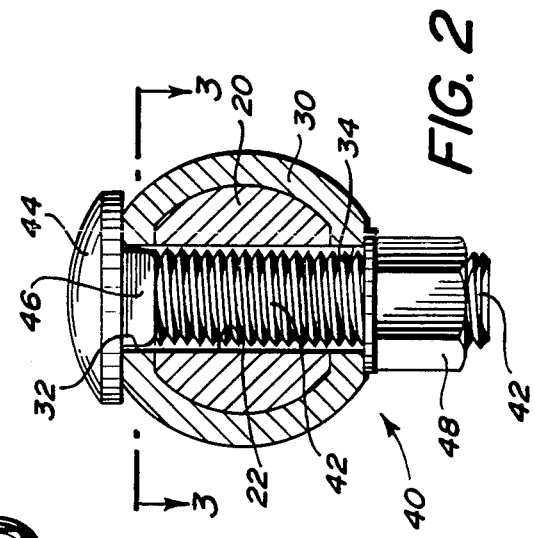

MIDPOINT CONNECTION FOR INTERMEDIATE SHAFT SUBASSEMBLY

This invention relates to the intermediate shaft of a steering column for use in automobiles; more particularly, it relates to an intermediate shaft subassembly which connects the upper and lower sections of the intermediate shaft and which includes a portion known as the midpoint connection.

Prior art patents disclose structures which employ telescoping members which are locked relative to each other by bolts extending through aligned bores through both members. An example of this type of prior art is included in U.S. Pat. No. 4,504,164 for a "Telescopic Shaft Coupling Arrangement" issued in the name of Alfred A. Bien on Mar. 12, 1985. Bien also discloses an inner shaft which has a generally D-shaped cross-section. The outer tubular member which makes a sliding fit with this inner shaft also has a D-shaped cross-section matching that of the inner shaft, as shown in FIGS. 5 and 6.

Some prior art patents disclose means for clamping the outer tube to the inner shaft by means of an external clamping member, without using a through bolt. An example of this type of prior art is disclosed in U.S. Pat. No. 3,741,032 for a "Collapsible Steering Column Assembly" issued in the name of Donald J. Baker on June 26, 1973. Baker discloses a clamp member having two U-shaped arms, with a polygonal bore through each arm. One arm bore surrounds the inner shaft and the other arm bore surrounds the outer shaft at its lower end, near the junction of the inner and outer shafts where they overlap. Both arms of the clamp member are preloaded with a bolt which is external to the inner and outer shafts. This bolt and clamp member provide a lash free connection between the inner and outer shafts, and they establish an axial preload between the shafts so that when the preload is overcome, the shaft assembly will collapse and the inner and outer shafts will telescope together.

One of the main problems with the prior art is that the various components of the clamping means require a relatively large volume of space. This is especially true for the prior art which employs external clamping means, since external components necessarily require a relatively larger envelope. Bien, who discloses the use of a through bolt, does not provide means for clamping the inner shaft and the outer tubular member in variable relative positions. Once the position of the bores has been determined, the relative position of the telescoping shaft and tubular member is also predetermined and cannot be changed easily.

The improved midpoint connection of the present invention overcomes these problems by using a through bolt in order to provide a relatively small envelope for the entire intermediate shaft subassembly in which the midpoint connection is included. The through bolt is employed in conjunction with a telescoping intermediate shaft and intermediate tube arrangement, wherein the shaft has an elongated slot which receives an attachment bolt. The bolt passes through aligned bores in the outer tube member and through the elongated slot of the shaft member. The relative position of the shaft and tube is variable, according to the length of the elongated slot. When the desired relative position is determined, the bolt is tightened. This tightening action deforms the outer tube member around the inner shaft to provide a securely clamped connection which minimizes rotational lash.

Briefly described, the present invention is an intermediate shaft subassembly which connects the upper and lower sections of the intermediate shaft, and which comprises an intermediate shaft member and an intermediate tube member. These two members have concentric sectional configurations which allow a sliding fit between the inner shaft member and the outer tube member. This telescoping fit allows for variable relative positioning of the two members. These members are connected by a midpoint connection which comprises a through bolt passing through aligned holes in the outer tube member and through an elongated slot in the shaft member. When the bolt is tightened, it deforms the outer tube member around the inner shaft so that they have matching concentric sectional configurations.

This invention may be better understood by reference to the following detailed description and drawings in which:

FIG. 1 is an elevational side view of the intermediate shaft subassembly of the present invention;

FIG. 2 is an enlarged sectional view of the midpoint connection of the intermediate shaft subassembly, taken along line 2—2 of FIG. 1; and FIG. 3 is a sectional view of the midpoint connection taken along line 3—3 of FIG. 2.

In the various figures, like parts are referred to by like numbers.

Referring to the drawings, and more particularly to FIG. 1, an intermediate shaft subassembly 12 comprises an inner intermediate shaft member 20, an outer intermediate tube member 30, and a midpoint connection 40. Outer tube member 30 has a first connecting means 14 on its axial end opposite midpoint connection 40. Likewise, inner shaft member 20 has a second connecting means 16 on its axial end opposite midpoint connection 40. In the preferred embodiment depicted in FIG. 1, connecting means 14 and 16 are standard universal joints well known in the art. The midpoint connection 40 connects inner shaft member 20 and outer tube member 30. The term "midpoint connection", as used in this patent application, refers to the connecting point between the upper intermediate shaft and the lower intermediate shaft, and is not intended to restrict the physical location of connection 40. It should be understood that connection 40 is not, in any way, required to be located midway between any two components of the intermediate shaft or steering column.

The upper intermediate shaft (not shown) would typically be connected to tube member 30 by first connecting means 14. Likewise, the lower intermediate shaft (not shown) would typically be connected to shaft member 20 by second connecting means 16. The final step in the assembly process for the steering column would be the connection of shaft 20 and tube 30. This final connection is facilitated by the use of midpoint connection 40, since the shaft 20 and tube 30 can be adjusted to the proper relative position to accommodate dimensional tolerances of the structure of each individual automobile. Once the proper relative position is reached, the midpoint connection 40 is tightened as described below.

Turning now to FIG. 2, an enlarged sectional view of the midpoint connection 40 is depicted. The midpoint connection 40 comprises an attachment through bolt 42 which passes through an elongated slot 22 in shaft member 20 and through aligned holes 32 and 34 through outer tube member 30. Bolt 42 has a head 44 which has a lower portion 46 with a polygonal sectional shape. The radial thickness of portion 46 is approximately equal to the thickness of the portion of tube member 30 penetrated by hole 32. Hole 32 also has a polygonal shape which matches that of portion 46 in order to prevent bolt 42 from rotating when it is tightened. A nut 48 is attached to the lower end of bolt 42 to enable bolt 42 to provide compression force on tube 30 as bolt 42 is tightened.

As can be seen in FIG. 3, the configuration of the preferred embodiment of the present invention includes a square cross-section for lower portion 46 of bolt head 44, with a matching square hole 32. As bolt 42 is tightened, intermediate tube member 30 is compressed about inner shaft member 20 at the connection area. This compression provides a snug concentric fit between shaft member 20 and tube member 30 so as to minimize rotational lash between the two members. A tight connection is also provided to prevent axial movement between the two members.

The advantages of the present invention include the fact that the volume occupied by the intermediate shaft subassembly is minimized, thus providing a relatively small envelope for the subassembly. When the intermediate shaft subassembly is supplied to the assembler, the subassembly is normally in the collapsed position with the inner shaft member inserted as far as possible into the outer tube member. This configuration requires a minimal volume and facilitates the positioning of the subassembly in the automobile.

In addition, the intermediate shaft subassembly of the present invention provides means for locking the inner shaft member and the outer tube member in variable relative positions, according to the dimensions of the automobile in which the subassembly is being installed. The axial length of slot 22 may be varied, as necessary, to accommodate assembly needs. Once the subassembly is properly positioned and connected in the automobile, the midpoint connection is tightened to lock the subassembly in place. The overall installation and assembly procedure is thereby made easier and quicker, thus making the labor cost less expensive.

Various modifications to the preferred embodiment of the invention described above may be made. For example, the sectional configuration of hole 32 and lower portion 46 of bolt head 44 may have suitable matching shapes, other than a square, which will prevent rotation of bolt 42. Any polygonal shape, for example, would provide this function.

I claim:

1. An intermediate shaft subassemlby connecting upper and lower sections of a intermediate shaft of a steering column, said subassembly comprising:
   an inner intermediate rigid shaft member having an elongated slot oriented along the longitudinal axis of said shaft member;
   an outer intermediate deformable tube member adapted to make a sliding fit around said shaft member, said tube member having aligned first and second holes therethrough;
   means for connecting said shaft member and said tube member to said upper and lower sections of said intermediate shaft; and
   a midpoint connection adapted to occupy a relatively small volume while providing means for locking said shaft member and said tube member together in a variable and predetermined relative position, said midpoint connection comprising a bolt positioned through said first and second aligned holes in said tube member and through said elongated slot in said shaft member, said bolt having on one end a bolt head configured to nonrotatably fit through said first aligned hole and the opposite end of said bolt being threaded to receive a nut providing means to tighten the connection between said shaft member and said tube member and thereby deform said tube member around said shaft member so as to form a tight connection providing minimal rotational lash.

2. An intermediate shaft subassembly according to claim 1, wherein said shaft member and said tube member have concentric non-circular sectional configurations at said midpoint connection.

* * * * *